United States Patent [19]

Federau

[11] Patent Number: 4,532,544

[45] Date of Patent: Jul. 30, 1985

[54] LINE-SCAN PANORAMIC CAMERA

[76] Inventor: Gregor Federau, Eichenstrasse 86, 2000 Hamburg 19, Fed. Rep. of Germany

[21] Appl. No.: 508,404

[22] Filed: Jun. 28, 1983

[51] Int. Cl.³ .......................... H04N 3/15; H04N 3/34
[52] U.S. Cl. ........................................ 358/87; 358/98; 358/213
[58] Field of Search ............................ 358/87, 98, 213

[56] References Cited

U.S. PATENT DOCUMENTS

| | | | |
|---|---|---|---|
| 3,499,107 | 3/1970 | Sheldon | 358/98 |
| 4,259,948 | 4/1981 | Urban | 358/87 |
| 4,473,841 | 9/1984 | Murakoshi | 358/98 |

FOREIGN PATENT DOCUMENTS

SU785693  12/1980  U.S.S.R. ................................ 358/98

Primary Examiner—Howard W. Britton
Attorney, Agent, or Firm—Beveridge, DeGrandi & Weilacher

[57] ABSTRACT

The present invention in general relates to a television camera for digital on-line image processing, comprising an optical imaging system which images an object area sensed by the camera into an image area adapted to be scanned element by element, and a processing circuit which produces video signals from the signals obtained with the scanning, the camera comprising a line sensor arranged in the optical image area, the line sensor being composed of sensor faces of a row of optical-electrical transducers so that the sensor faces are disposed in the optical images of correspondingly set-off elements of the object area and each sensor face defines, upon movement of the line sensor relative to the object area perpendicularly of the length of the line sensor, a scanning line.

10 Claims, 5 Drawing Figures

LINE-SCAN PANORAMIC CAMERA

DESCRIPTION OF THE PRIOR ART

On-line image processing, especially in pattern recognition and inspection tasks, needs high processing speeds, which can be achieved by minimising the amount of pre-processing operations. In detail, the grey level of the blank TV-image should be constant in time and space, the TV-signal should have high contrast and signal-to-noise ratio, the image geometry should be simple and matched to the buffer organization and the recognition/inspection task, and image data should be restricted to relevant areas of the objects under test.

If object and camera are moved relative to each other, as necessary for line scan cameras, the distortion-free transmission of control and image signals may be difficult.

TV-cameras of the type referred to in this paper were suggested, which incorporate the line sensor located in an airplane or a satellite for the purpose of areal imaging; relative motion of object and camera (scanning, perpendicular to the direction of the line sensor) results from the airplane's or satellite's motion relative to the object area on the surface of the earth. In the same paper (Gilbert F. Amelio: "Charge-Coupled Devices" in: Scientific American 230(1974) Volume 2, pages 23–31) it was suggested to realize the relative motion by placing a two-dimensional area of the object under test on the circumference of a rotating drum, and by adding a stationary line sensor parallel to the drum's axis, which scans the drum's surface, eventually by the means of an optical imaging system. This setup is useful only for such object areas, which are on or can be placed onto the surface of a rotating drum.

Obviously, also the inverse setup would be possible: moving the line sensor on an orbit around the (stationary) circumferential surface of the drum; for this setup, however, more mechanical parts are necessary to maintain the relative motion, and means such as electrical slip rings must be provided for the transmission of the control and image signals between the moving line sensor and the stationary image processing unit and/or display.

These additional efforts would not be counterbalanced by better results; it may be concluded, that the object should be moved rather than the line sensor.

SUMMARY OF THE INVENTION

The aim of the instant invention is to create an on-line TV-camera with line sensor, which may be useful for a broad range of applications. The invention consists of a TV-camera of the type mentioned above; it's characteristic features are:

the line sensor for the imaging of an panoramic object space is located on the panoramic axis or its image, the sensor elements coincide with the images of axially displaced elements of the object space, when the line sensor is rotated, each sensor element defines a scanning line with rotational symmetry to the panoramic axis, the signals between the line sensor and the sensor's electrical control circuits are transmitted via a multichannel optical rotary joint without mechanical contacts.

The TV-camera related to in this invention makes it possible to create on-line panoramic TV-images with large field angles in a very simple manner, and with simple and exact geometric relations between object and image. The camera can be made very small and compact, which faciliates the inspection of relatively small-sized hollow objects (like boreholes and pneumatic or hydraulic cylinders).

These advantages counterbalance easily the necessity of providing a rotating signal transmission unit. Beyond that, the invention covers a multichannel optical rotary joint without mechanical contacts, which can transmit analog signals of high bandwidth without distortions, and which faciliates the high processing speeds, which are necessary and desired for on-line image processing.

The instant invention has also important advantages with respect to other known on-line TV-cameras, in which the optical image is raster-scanned by means of an energetic beam. The necessary devices, especially vacuum parts, have much more volume and weight and are more delicate than the parts of the TV-camera referred to in this invention.

The scanning principle and the inherent advantages with respect to geometric accuracy and reproduceability are not and cannot be realized with TV-cameras using an energetic beam. Principally, the geometric inaccuracies could be minimized by using a slit-mask in front of the image plane of a conventional TV-camera and scanning over the object space, but such a solution would be even more sophisticated than the known technique with stationary TV-camera using an energetic beam.

Another advantage of the TV-camera referred to in this invention is, that there is, because of the rotation of the line sensor itself, no need for an image-rotating device lika a Dove prism, which may introduce distortion and wobble of the image. The geometric relations between object and image elements are very simple; distortion problems, which are well-known from classical wide angle imaging, are avoided by the scanning principle.

An earlier application (DE-OS No. 31 33 326) refers to a portable thermal recorder; the operating principle is the scanning rotation of a line of optoelectric sensors in the image plane of a thermal image; but this image is a flat object with respect to the scanning device which extends over it's diameter, and not a panoramic object which is scanned by a line sensor lying parallel to the panoramic axis. Thus the geometric accuracy of the thermal recorder of the earlier application is much inferior to that of the instant invention. A panoramic object space is not scanned by the thermal recorder.

Another application (DE-OS No. 26 33 742) refers to an endoscopic camera, which images an object space onto a self-scanning solid state area image sensor by means of an optical system; the sensor's output is an electronic video signal. The area sensor itself is not rotated or moved with respect to the optical system, and scans the whole image area rather than a single line. A field angle comparable with that of panoramic images cannot result from this principle, because the field angle is defined by the optical system itself. A distortion-free direct scanning of a panoramic object space is not executed by this endoscopic camera.

In the preferred embodiment of the TV-camera referred to in this invention the optical imaging system is mounted in a rugged camera head, where it is protected against mechanical and other influences. The camera head can be designed deliberately, especially with a long and relatively narrow tube, as to make an endoscopic camera. Preferably the camera head can be rotated around the panoramic axis, and the optical imaging system and the line sensor are both mounted in fixed positions in the camera head. In this design the camera head can be driven by a simple external rotational drive.

When operating, the camera will normally scan different object regions sequentially, for instance by an axial motion of the camera or the camera head along the panoramic axis. For this purpose the camera head mentioned above can be attached to the camera with a degree of freedom in the direction of the panoramic axis. This design has the advantage, that the camera can be mounted in a device in fixed position; only the camera head needs beeing moved for the scanning of deep boreholes and similar objects.

Two kinds of motion of the camera head along the panoramic axis are possible:

continuous motion during the scanning rotation, which results in a helical object surface, or discrete steps between the scanning rotations, which results in cylindrical object surfaces.

Many of the attendant advantages of this invention will be readily appreciated as the same becomes better understood by reference to the following detailed description when considered in connection with the accompanying drawing wherein:

DESCRIPTION OF THE PREFERRED EMBODIMENT

Figure 1:
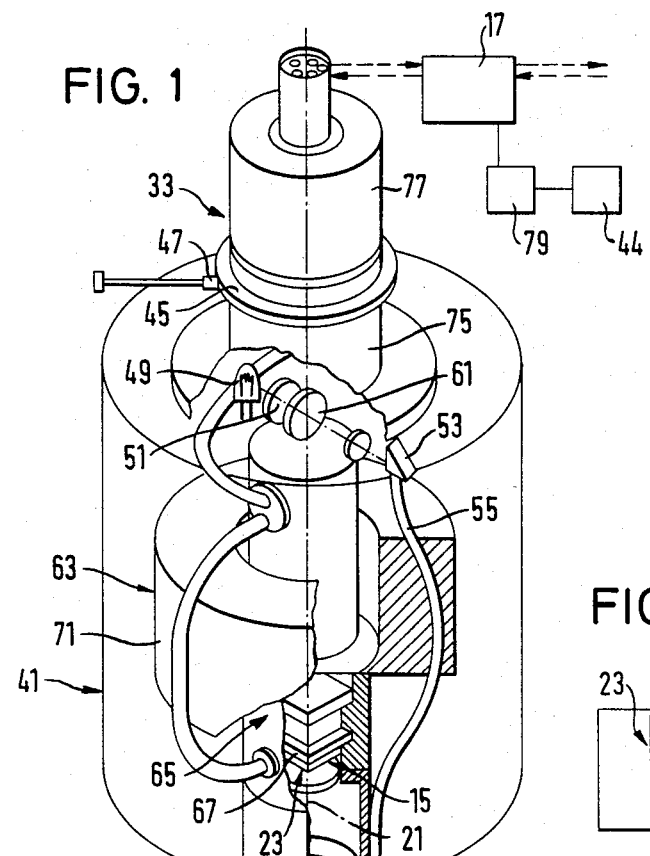
FIG. 1 is a schematic perspective phantom-drawing, with partially broken-away walls, as sort of side view of a camera refered to in this invention.
Figure 2:
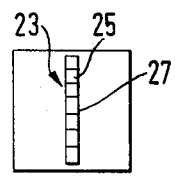
FIG. 2 is a schematic illustration of a line sensor, as sort of a top view.
Figure 3:
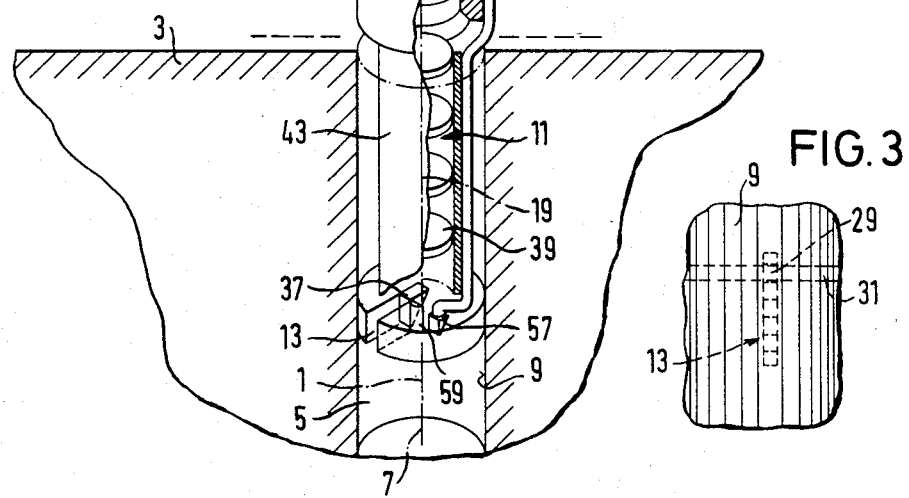
FIG. 3 is a schematic illustration, as sort of a radial partial top view of the object area scanned with the apparatus shown in FIG. 1.

FIGS. 1 to 3 illustrate schematically a TV-camera for digital on-line image processing. The camera is designed for the optical imaging of an object space which is distributed around a panoramic axis 1. The camera shown in this embodiment is part of an endoscope which images the interior wall of a hollow body 3, whose interior space 5 exhibits, in the case shown here, rotational symmetry with respect to an object axis 7. Thus the interior wall of the hollow body 3 represents the object 9 of the optical imaging process. In the case illustrated here the panoramic axis 1 defined by the camera's design is suitably coaxial to the object axis 7, as shown. The camera has an optical imaging system 11, which images an object space 13, in this case part of the interior surface of the interior space 5 into an image area 15, which can be scanned element by element.

The camera has an operating circuit 17, which converts the electrical scan signals into video signals, which may be used to form a TV image or to be processed in computers or other equipment.

In the embodiment shown, the imaging system 11 exhibits an optical axis 19, which is coaxial to the panoramic axis 1, and the optical image 21 of the panoramic axis is coaxial to the panoramic axis 1. This design needs little space and faciliates assembling the essential parts of the camera into a narrow tube convenient for endoscopic use. In the image area 15 there are situated the line-shaped sensitive areas of a line sensor 23, which can be rotated around the panoramic axis 1; the line sensor is made up from sensor elements 27 with sensor areas 25 in that manner, that the sensor areas are situated in the optical images (magnification defined by the optical imaging system) of axially adjacent elements 29 of the object space 13 and that each single sensor area 25 defines a scan line (for instance 31) on the object 11 with rotational symmetry to the panoramic axis 1, when the line sensor 23 is rotated around the optical image 21 of the panoramic axis 1.

The line sensor incorporates a processing circuit (not shown in detail) which, on command of a start signal, scans the individual sensors 27 sequentially and modulates a carrier signal (for instance a clock signal of 10 MHz) with the individual sensor signals. The resulting primary image signal of high frequency (the video signal), as well as the scan signals and other control and synchronisation signals, are transmitted via a multichannel optical rotary joint 33 without mechanical contacts to the operating circuit 17, which in turn generates video signals and transmits them to a subsequent image processor (not shown here).

In the embodiment shown here, the object space 13 imaged by the camera is restricted to a small sector around the optical axis 19, i.e. a narrow line-shaped area orientated parallel to the optical axis 19, and the optical rays are deflected by 90° into the direction of the optical axis 19 by means of an optical deflection unit 37, shown here as a deflection prism. This setup shows much less geometrical distortion than a setup without deflection unit 37. For focussing the optical imaging system 11 onto different object regions (here: different inner diameters of the hollow body 3), it has focussing means such as a front lens 39 which can be moved on the optical axis 19. Such focussing means are known in optics and therefore are not shown here for simplicity.

Figure 5:
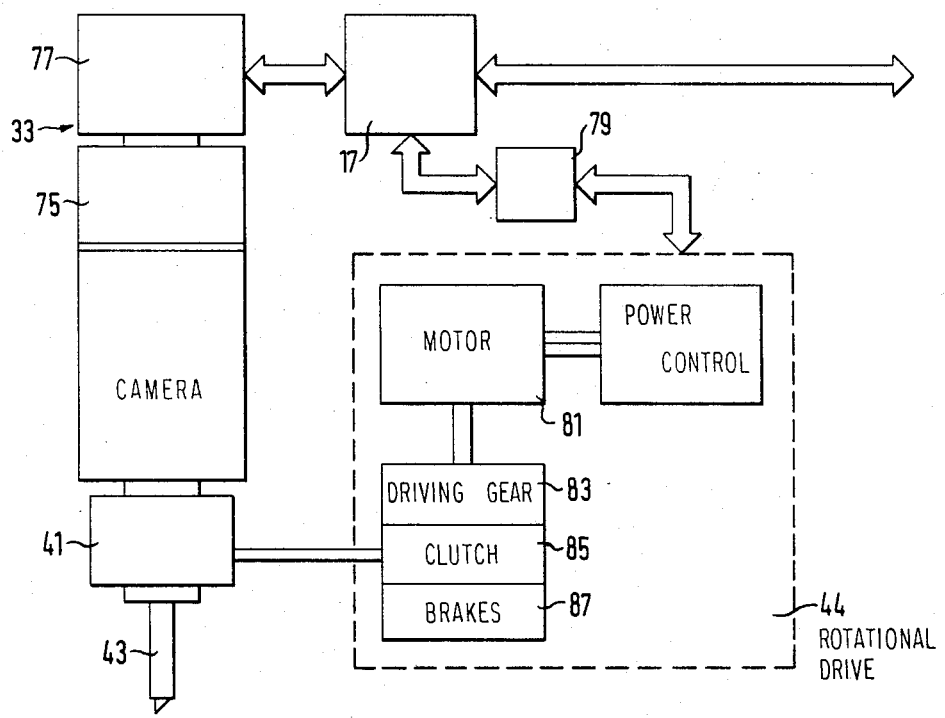
FIG. 5 is a block diagram for the operating principle of the camera.

In the embodiment shown here, the line sensor 23 and the optical imaging system 11 are mounted in a camera head 41 in a protected manner, in detail in a relatively narrow tube 43 belonging to the camera head 41 especially convenient for endoscopic use. The optical rays coming from the imaged object space 13 pass through a window (not shown here) to the deflection unit 37. The camera head 41 is mounted on the camera body (not shown here) by bearings and can be rotated around the panoramic axis 1, and the line sensor 23 is mounted on the camera head 41 in a fixed position. This allows the rotational drive 44 (FIG. 5, not shown in FIG. 1) to be designed in a rugged and easy accessible manner. Furthermore, the camera head 41 may be mounted on the camera body (not shown here) with an axial degree of freedom. This is an advantage for the industrial use, because the camera body (not shown here) may be attached stationary to a machine body.

To assure a unique correlation between the generation of the video signals and the motion of the line sensor 23, especially in start-up and slow-down conditions, convenient synchronization means may be used. FIG. 1 shows an encoding disc 45 as a simple embodiment of such synchronization means, which is mounted on the rotatable camera head 41, and which is read out by a stationary synchro-sensor 47. By using such synchronization means also the generation of video signals may be limited to selected parts of the panorama imaged by the camera.

The sensitivities of the sensor elements 27 of the line sensor 23 may be controlled individually, to avoid systematic errors caused by inhomogeneous illumination of the object space and/or different sensitivities of the sensor elements. This is simple for single elements, but may be difficult in the case of multi-element sensors for high resolution applications, which may be made up from 1000 and more elements on the length of about 1 cm. In most cases it may be more convenient to use an object illumination with controllable distribution of illuminance. This may be achieved in a particularly simple manner by using an optical neutral filter with varying density over the filter area. In any case, the camera shall possess control means to equalize the signals of all sensor elements 27 for an object space 13 with uniform background. By this it will be assured, that a nonuniformity of the video signal is caused only by a corresponding non-uniformity of the object's surface.

For high resolution applications the optical input power for the single sensor element will be rather small; it is thus desirable for a sufficiently high signal-to-noise ratio of the video signal and a high contrast of the TV-image generated by the video signal, to maintain optimum illumination conditions. In the embodiment shown here, this is achieved by placing a powerful lamp 49, for instance a tungsten halogen lamp or a Xenon arc lamp, at a place distant from the narrow tube 43 and with space enough for the lamp. A condensor 51 collects as much light as possible and focusses it onto a coupling prism 53 at the entrance of a fiber optic light guide 55. At the other end of the light guide 55 the light is guided through another coupling prism 57 and a cylindric lens 59 into the object space 13. The cylindric lens 59 is positioned close to the deflection unit 37. The illuminated area is only slightly more extended than the object space 13 to be imaged.

For a high signal-to-noise ratio it is advantageous to provide cooling for the sensor elements 27. In the embodiment shown here a cooling unit 63 is provided for this purpose. It contains a thermoelectric (Peltier-) cooling module 65 in thermal contact with the line sensor 23 via a metal block on the cold side and with a radiator 71 on the hot side. The radiator 71 may work by its own heat capacity or by external cooling (not shown). To avoid condensation on the optical surfaces, the adjacent cavities as well as the camera head as a whole may be hermetically sealed and filled with a dry inert gas.

The current for the lamp and for the thermoelectric module 65 is provided by means not shown here, for instance by slip rings or induction coils.

The scan signals and control signals from the operating circuit 17 to the line sensor 23 and the video signals from the line sensor to the operating circuit are transmitted via the multichannel optical rotary joint 33. This rotary joint 33 consists of two halves 75, 77, rotated relatively to each other. The operating circuit 17 delivers control signals for the line sensor 23 and for the rotational control 79 for the rotational drive 44. The latter consists of a clutch 85 and breaks 87.

Figure 4:
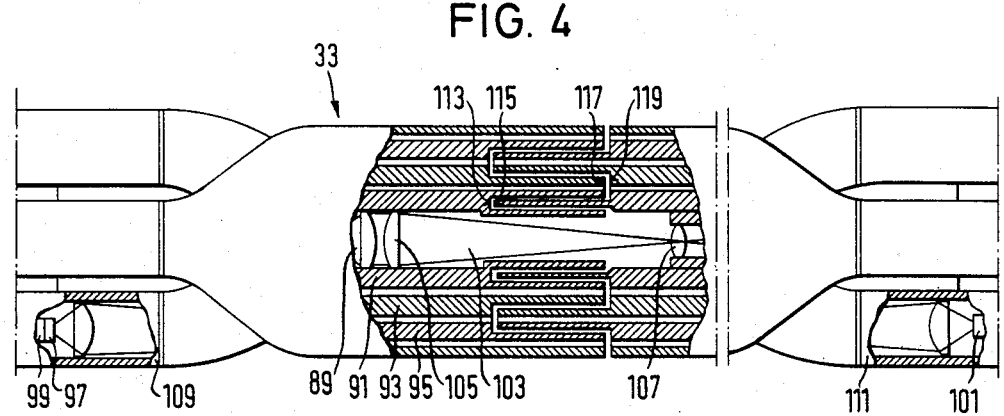
FIG. 4 is a partially cut-on schematic side view of an optical rotary joint convenient for the camera refered to in this invention.

FIG. 4 illustrates the optical rotary joint 33 in detail. The rotary joint is designed as optical joint with several concentric light guides 89, 91, 93 and 95. Optical emitters are placed at the entries of the light guides. FIG. 4 shows only one single emitter 97 and one single input-amplifier 99 for the light guide 91. The optical detectors and amplifiers are placed at the exits of the light guides. The optical emitters are preferably realized as laser diodes or light emitting diodes for visible or infrared light. The optical detectors may be avalanche- or p-i-n-photodiodes. FIG. 4 shows only one single detector 101.

The central light guide 89 is placed in a central tube made up from two parts with air-gap. An optical illumination system made up from condensor 105 and field lens 107 provides homogeneous illumination of the detector, not shown here. The central tube 103 is light proof by means of masks (not shown here). The outer light guides or transmission channels contain each two fiber bundles which face each other with ring-shaped faces and which have circle-shaped endfaces. The optical emitters and detectors belonging to the fiber optic light guides, for instance the emitter 97 and the detector 101 (shown in FIG. 4) are placed in plug-in tubes, for instance 109, 111, together with coupling lenses and amplifiers. This design allows the transmission direction to be reversed easily. The light guides are separated optically, to avoid crosstalk. Furthermore the pairs of fiber endfaces of different channels are deplaced axially relative to each other, as shown for instance the pairs 113, 115 and 117, 119 in FIG. 4. Furthermore different light carrier frequencies (spectral bands, wavelengths) are used to seperate the different channels, and additional filters are provided on the side of the rotary joint 33 belonging to the operating circuit 17. All these measures serve for minimizing cross talk, which is not critical for digital signals but for analog signals as used with this type of rotary joint. As an example the light channels may be wavelength-separated as follows:

Channel 89: Emitter IRED 900 nm, spectral half width 50 nm, detector equipped with long-pass edge filter 800 nm Channel 91: Emitter LED 670 nm, half width 50 nm, detector equipped with short-pass edge filter 700 nm.

Subsequent channels are equipped in an alternating way like the channels 89 and 91. This provides double crosstalk protection.

I claim:

1. A television camera for digital on-line image processing, comprising an optical imaging system which images an object area sensed by the camera into an image area adapted to be scanned element by element, and a processing circuit which produces video signals from the signals obtained with the scanning, the camera comprising a line sensor arranged in the optical image area (15), the line sensor being composed of sensor faces of a row of optical-electrical transducers (27) so that the sensor faces are disposed in the optical images of correspondingly set-off elements (29) of the object area and each sensor face (25) defines, upon movement of the line sensor relative to the object area perpendicularly of the length of the line sensor, a scanning line (31), characterized in that for sensing an optical object distributed about a panoramic axis (1), and for producing the relative movement, the line sensor (23) is rotatively drivable about the optical image (21) of the panoramic axis (1) and is arranged so that the sensor faces are disposed in the optical images of axially set-off elements (29) of the object area (13), and each sensor face (25) defines, upon rotation of the line sensor, a scanning line (31) having rotative symmetry with respect to the panoramic axis (1), and in that the output of the line sensor (23) is connected to the processing circuit (17) via a multi-channel optical contactless rotary joint (33).

2. A camera according to claim 1, characterized in that the axis (19) of the imaging system (11) is disposed coaxially of the panoramic axis (1).

3. A camera according to claim 1, characterized in that the optical imaging system comprises an optical deflection unit (37) which deflects the imaging rays by 90° into the optical axis (19).

4. A camera according to claim 1, characterized in that the optical image (21) of the panoramic axis is disposed coaxially of the panoramic axis (1).

5. A camera according to claim 1, characterized in that the optical imaging system (11) is protectively arranged in a camera head (41), and in that the camera head (41) is rotatively drivable about the panoramic axis (1), and the optical imaging system (11) and the line sensor (23) are fixedly arranged in the camera head (41).

6. A camera according to claim 5, characterized in that the camera head (41) is axially movable at the camera in the direction of the panoramic axis (1).

7. A camera according to claim 1, characterized by synchronizing means effective between the movement of the line sensor (23) and the production of the video signals.

8. A camera according to claim 1, and comprising an illuminating device for illuminating the object area, characterized in that the illuminance distribution produced in the object area (13) by the illuminating device is adjustable so that the signals of all transducers (27) are equal in the case of a nonstructurized object.

9. A camera according to claim 1, characterized in that the rotary joint (33) is designed as an optical joint having a plurality of concentric light guides (89, 91, 93, 95), in that in each light guide, a pair of opposed, non-contacting end surfaces are provided through which the radiation is transmitted, and in that each an electrical optical transmitter with a control amplifier, and an optical-electrical receiver are provided in the inputs and outputs, respectively, of the light guides.

10. A camera according to claim 1, characterized in that it is a constituent of an endoscope.

* * * * *